United States Patent
Kielwein et al.

[11] Patent Number: 6,158,685
[45] Date of Patent: Dec. 12, 2000

[54] BLOCKING MECHANISM FOR A SEAT BELT RETRACTOR

[75] Inventors: Thomas Kielwein, Eschach; Jürgen Rink, Waldstetten; Johannes Schmid, Schwäbisch Gmünd, all of Germany

[73] Assignee: TRW Occupant Restraint Systems GmbH & Co. KG, Alfdorf, Germany

[21] Appl. No.: 09/356,766

[22] Filed: Jul. 13, 1999

[30] Foreign Application Priority Data

Jul. 13, 1998 [DE] Germany ............... 298 12 435 U

[51] Int. Cl.$^7$ ............................................. B60R 22/405
[52] U.S. Cl. ................................. 242/383.2; 242/384.6
[58] Field of Search ........................... 242/383.2, 383.5, 242/384.6; 280/806; 297/478

[56] References Cited

U.S. PATENT DOCUMENTS

| | | |
|---|---|---|
| 4,170,329 | 10/1979 | Takada . |
| 4,177,962 | 12/1979 | Hildebrandt . |
| 4,858,847 | 8/1989 | Ogris . |
| 5,071,194 | 12/1991 | Fohl . |
| 5,695,146 | 12/1997 | Schmidt et al. ............ 242/384.1 |
| 5,826,813 | 10/1998 | Hibata ............ 242/383.2 |

FOREIGN PATENT DOCUMENTS

| | | |
|---|---|---|
| 2751362 | 5/1978 | Germany . |
| 2722744 | 11/1978 | Germany . |
| 4424744 | 1/1996 | Germany . |
| 4426479 | 2/1996 | Germany . |
| 2263626 | 8/1993 | United Kingdom . |
| 2286624 | 8/1995 | United Kingdom . |

*Primary Examiner*—John M. Jillions
*Attorney, Agent, or Firm*—Tarolli, Sundheim, Covell, Tummino & Szabo L.L.P.

[57] ABSTRACT

A blocking mechanism for a seat belt retractor has a belt reel (10) rotatably mounted in a frame (12), a ratchet toothing (16) arranged on the frame, a ratchet pawl (24) arranged on the belt reel (10) for cooperation with the ratchet toothing (16) and an inertial disc (20) used as a belt webbing-sensitive sensor element. The inertial disc (20) is rotatable relative to the belt reel (10). The ratchet pawl (24) is pivotally mounted on the inertial disc (20). The belt reel (10) has an actuating element (26a) engaging the ratchet pawl (24). In operation, the actuating element (26a) causes the ratchet pawl (24) to engage with the ratchet toothing (16) when the belt reel (10) is rotated relative to the inertial disc (20).

10 Claims, 1 Drawing Sheet

BLOCKING MECHANISM FOR A SEAT BELT RETRACTOR

The present invention relates to a blocking mechanism for a seat belt retractor.

BACKGROUND OF THE INVENTION

Vehicular seat belt retractors typically comprise a belt reel rotatably mounted in a frame and ratchet toothing arranged on the frame. Arranged on the belt reel are one or two ratchet pawls which are urged to engage with the ratchet toothing on the frame to activate the blocking mechanism and to block the belt reel non-rotatably. For belt webbing-sensitive activation of the blocking mechanism an inertial disc is mounted on the belt reel rotatable relative thereto. When, due to its mass inertia, the inertial disc trails the rotation of the belt reel it urges by a control cam an actuating shoulder on the ratchet pawl causing the latter to pivot into mesh with the ratchet toothing on the frame.

Geartooth clashing is a problem usually obviated by synchronous meshing. In such a synchronous mesh each or every ratchet pawl is deflected in the direction of the frame only in specific rotary positions of the belt reel so that it can only come into contact with tooth gaps. Synchronizing the blocking mechanism is, however, a complicated procedure.

Also a problem with known blocking mechanisms for belt retractors is wear of the ratchet pawl and ratchet toothing in frequent activation as observed in so-called endurance tests. This wear necessitates use of materials having a correspondingly high load capacity and a generous dimensioning of the components involved.

SUMMARY OF THE INVENTION

The invention provides a blocking mechanism for belt retractors which requires no synchronization and features low wear in frequent activation. In the belt retractor in accordance with the invention the ratchet pawl is not mounted on the belt retractor but on the inertial disc, i.e. it not being the inertial disc but the belt retractor that comprises an actuating element causing the ratchet pawl to engage with the ratchet toothing on the frame when the belt reel is rotated relative to the inertial disc. By this simple arrangement the mating action of the ratchet pawl is basically changed. On a conventional belt retractor the ratchet pawl is mounted on the belt reel with which it rotates. For a belt webbing-sensitive mating action a sudden rotation of the belt reel is needed. Since the ratchet pawl turns with the belt reel it has at the point in time of its meshing with the ratchet toothing on the frame a correspondingly high peripheral velocity relative to the ratchet toothing. It is this peripheral velocity of the ratchet pawl that results in clash and wear when coming into contact with the ratchet toothing. In the blocking mechanism in accordance with the invention, however, the ratchet pawl is mounted on the inertial disc which on sudden rotation of the belt reel remains halted, thus also causing the ratchet pawl to remain halted relative to the ratchet toothing on the frame, but is pivoted by the rotation of the belt reel and meshes with the ratchet toothing. Under load the ratchet pawl is supported on the belt reel. For this purpose a pocket is preferably recessed in a flange of the belt reel, the ratchet pawl being arranged in this pocket.

Even when ratchet pawl and ratchet toothing on the frame clash, mating is reliably assured since immediately following this first contact the ratchet pawl is rotated with the belt reel so that the tip of the tooth on one flank of the ratchet toothing is guided into the next tooth gap. By avoiding high speed of the ratchet pawl relative to the ratchet toothing at the moment of meshing the wear as observed on known belt retractors is eliminated.

By directly mating the ratchet pawl in the ratchet toothing the blocking action is concluded with minimum delay so that a small length of belt webbing is withdrawn. For the same reason the blocking mechanism is also suitable for belt systems having a tensioning means, more particularly, tensioners engaging the belt buckle, these tensioners requiring a very fast response of the blocking mechanism.

BRIEF DESCRIPTION OF DRAWINGS

Further advantages and features of the invention read from the following description of a preferred embodiment and from the drawing to which reference is made and in which.

DESCRIPTION OF PREFERRED EMBODIMENTS

Figure 1:
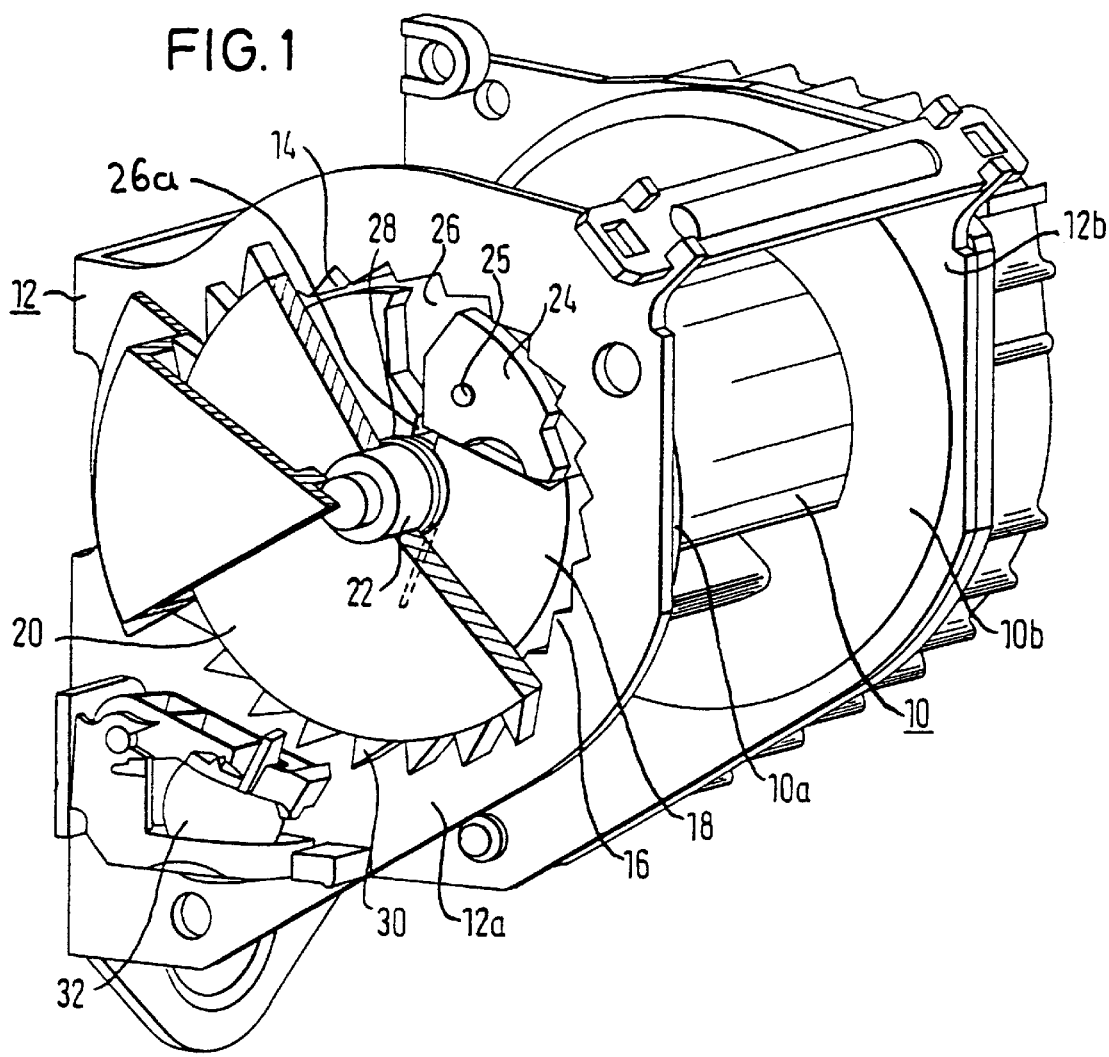
FIG. 1 is a partial section view in perspective of a belt retractor including a blocking mechanism.

Referring now to FIG. 1 there is illustrated a belt retractor in which a belt reel 10 is rotatably mounted in a frame 12 in the usual way. The generally U-shaped frame 12 comprises in one of its two side wings 12a, 12b an opening 14 rimmed by the ratchet toothing 16 extending full circle. The belt reel 10 comprises two flanges 10a, 10b. The one flange 10a adjoins the inner side of the wing 12a of the frame 12 and carries an integrally applied supporting disc 18 penetrating into the space surrounded by the opening 14. The inertial disc 20 is rotatably mounted on a bearing pin 22 of the belt reel 10. In FIG. 1 the inertial disc 20 is illustrated sectioned roughly diametrally to expose to view the substantial elements of the blocking mechanism. These include a ratchet pawl 24 which is pivotably mounted by means of a pin 25 on the inertial disc 20. Recessed in the supporting disc 18 is a pocket 26 in which the ratchet pawl 24 is arranged. The ratchet pawl is thus located in the space defined by the inertial disc 20, the pocket 26 and the flange 10a. By means of a spring 28 the inertial disc 20 is pretensioned in a rotary position limited by a stop relative to the belt reel 10. The inertial disc 20 is provided at its outer circumference with control toothing 30 cooperating with a vehicle-sensitive inertial sensor 32.

Figure 2:
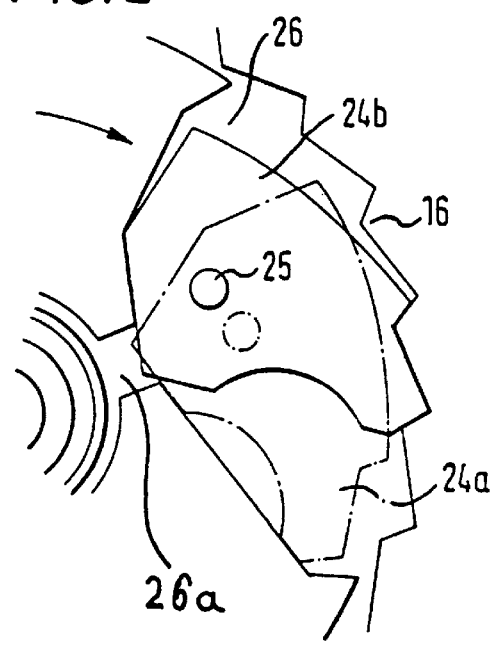
FIG. 2 is a partial section view of the blocking mechanism on a magnified scale.

The inertial disc 20 forms a belt webbing-sensitive sensor element. On sudden rotation of the belt reel 10 the inertial disc 20 remains halted or trails the rotation of the belt reel 10, this also resulting in the ratchet pawl 24 remaining halted or trailing. Referring now to FIG. 2 there is illustrated the ratchet pawl 24 in its resting position at 24a and in its activated position at 24b by it being pivoted about the pin 25 and urged to mesh with the ratchet toothing 16 on the frame 10. The ratchet pawl 24 forms a two-armed lever carrying on its first arm two teeth and on its second arm an actuating shoulder. This actuating shoulder engages a 26a recess at the radially inner base of the pocket 26. When the belt reel is rotated relative to the inertial disc 20 the supporting disc 18 is urged against the actuating shoulder of the ratchet pawl 24 pivoting it counterclockwise. The movement of the inertial disc 20 relative to the belt reel 10 is defined by the ratchet pawl 24 coming into contact with the rim of the pocket 26 so that ultimately it is supported load-bearing at the belt reel 10.

The pin 25 is pliantly mounted in the inertial disc 20 to ensure automatic orientation of the teeth of the ratchet pawl 24 relative to the ratchet toothing 16, thus permitting relatively large production tolerances.

The special feature of the blocking mechanism as described consists of the ratchet pawl 24 being mounted on the inertial disc 20 so that on meshing, just like the inertial disc, no rotation of the belt reel occurs, or only to a greatly reduced degree, as a result of which a high peripheral speed relative to the ratchet pawl, on the one hand, and to the ratchet toothing, on the other, is avoided.

It is to be noted that even the design as evident from the drawing, having but a single ratchet pawl 24, attains the necessary ultimate load, remarkable in this respect being, apart from the compact configuration, the great simplicity of the blocking mechanism as described. Despite this simplicity the blocking mechanism as described is superior to conventional designs having several pawls mounted on the belt reel both as regards mating action and as regards wear.

Preferably the ratchet pawl 24 is mounted at its center of gravity so that it is neutral in response to forces arising from rotation of the inertial disc 20. The geometry of the ratchet toothing 16 and corresponding teeth on the ratchet pawl 24 is also of significance for the mating action. As evident from FIG. 2 the flanks of the toothing are non-symmetrical and sloped to only a minor degree. Relative to the direction of rotation of the belt reel in uncoiling of the belt webbing, as indicated by the arrow in FIG. 2, the leading flanks of the ratchet toothing 16 are shorter and more sloped than those trailing. Should, in an extreme situation, the tips of the ratchet pawl 24 clash with those of the ratchet toothing 16, subsequent rotation of the belt reel includes the belt reel in the movement so that its tooth tip glides along a longer and less sloped flank of the ratchet toothing 16 to reliably engage the next tooth gap.

On rotation of the belt reel in the retracting direction subsequent to a locking action the ratchet pawl—promoted by the toothing geometry—is re-released following the shortest of an angle of rotation, thus eliminating the need for any special measures in preventing an unwanted blocking condition of the belt retractor.

What is claimed is:

1. A blocking mechanism for a seat belt retractor, comprising a frame, a belt reel rotatably mounted in said frame, a ratchet toothing arranged on said frame, a ratchet pawl arranged on said belt reel for cooperation with said ratchet toothing, and an inertial disc forming a webbing-sensitive sensor element, said inertial disc being rotatable relative to said belt reel, said ratchet pawl being mounted on said inertial disc and said belt reel comprising an actuating element engaging said ratchet pawl, said actuating element causing said ratchet pawl to engage with said ratchet toothing when said belt reel is rotated relative to said inertial disc.

2. The blocking mechanism as set forth in claim 1, wherein said ratchet pawl mounted on said inertial disc is additionally supported on said belt reel.

3. The blocking mechanism as set forth in claim 2, wherein said belt reel has an integral support disc with a recessed pocket in which said ratchet pawl is arranged.

4. The blocking mechanism as set forth in claim 3, wherein said ratchet pawl is arranged between said belt reel and a flange of said belt reel.

5. The blocking mechanism as set forth in claim 1, wherein said ratchet pawl is pivotably mounted on a pin attached to said inertial disc.

6. The blocking mechanism as set forth in claim 3, wherein said ratchet pawl forms a two-armed lever having a first arm on which at least one ratchet tooth is formed and a second arm formed with an actuating shoulder.

7. The blocking mechanism as set forth in claim 6, wherein said actuating shoulder engages a recess at a radially inner base of said pocket.

8. The blocking mechanism as set forth in claim 1, wherein said inertial disc comprises at an outer circumference thereof a control toothing for cooperation with a vehicle-sensitive inertial sensor.

9. The blocking mechanism as set forth in claim 1, wherein said ratchet pawl has a limitedly pliant mount at said inertial disc.

10. The blocking mechanism as set forth in claim 1, wherein said ratchet toothing comprises non-symmetrical tooth flanks which, as viewed in an unwinding direction of said belt retractor, are shorter and steeper on a leading side than on a trailing side.

* * * * *